(12) United States Patent
Espinosa

(10) Patent No.: US 8,689,554 B2
(45) Date of Patent: Apr. 8, 2014

(54) ENGINE ARRANGEMENT WITH AN IMPROVED EXHAUST HEAT RECOVERY ARRANGEMENT

(75) Inventor: Nicolas Espinosa, Irigny (FR)

(73) Assignee: Renault Trucks, St. Priest (FR)

( * ) Notice: Subject to any disclaimer, the term of this patent is extended or adjusted under 35 U.S.C. 154(b) by 162 days.

(21) Appl. No.: 13/384,303

(22) PCT Filed: Jul. 21, 2009

(86) PCT No.: PCT/IB2009/006709
§ 371 (c)(1),
(2), (4) Date: Jan. 16, 2012

(87) PCT Pub. No.: WO2011/080527
PCT Pub. Date: Jul. 7, 2011

(65) Prior Publication Data
US 2012/0111001 A1    May 10, 2012

(51) Int. Cl.
*F02B 33/44* (2006.01)
*F02M 25/07* (2006.01)
*F02G 3/00* (2006.01)
*F01K 23/10* (2006.01)

(52) U.S. Cl.
USPC ............................ 60/605.2; 60/616; 60/618

(58) Field of Classification Search
USPC ........................................ 60/605.2, 616, 618
See application file for complete search history.

(56) References Cited

U.S. PATENT DOCUMENTS

| | | | | |
|---|---|---|---|---|
| 5,375,409 | A * | 12/1994 | Lamar | 60/775 |
| 6,470,682 | B2 * | 10/2002 | Gray, Jr. | 60/605.2 |
| 7,059,308 | B2 * | 6/2006 | Eitel et al. | 123/568.12 |
| 2007/0204619 | A1 * | 9/2007 | Pelz et al. | 60/605.2 |
| 2008/0047267 | A1 * | 2/2008 | Kardos et al. | 60/605.2 |
| 2009/0205326 | A1 * | 8/2009 | Watson | 60/605.2 |
| 2010/0180584 | A1 | 7/2010 | Berger et al. | |
| 2011/0100341 | A1 * | 5/2011 | Yacoub | 123/568.11 |

FOREIGN PATENT DOCUMENTS

| | | |
|---|---|---|
| CN | 1363764 A | 8/2002 |
| EP | 1617069 A1 | 1/2006 |
| FR | 2910388 A3 | 6/2006 |
| JP | 2001132538 A | 5/2001 |
| WO | 2008066482 A1 | 6/2008 |

OTHER PUBLICATIONS

International Search Report for corresponding International Application PCT/IP2009/006709.
Chinese Official Action (Jun. 24, 2013) from corresponding Chinese App. 200980160655.2 (translation).
DE102007052117 (abstract) May 7, 2009 Voith Patent GmbH (corresponds to US20100180584).

* cited by examiner

*Primary Examiner* — Thai Ba Trieu
*Assistant Examiner* — Ngoc T Nguyen
(74) *Attorney, Agent, or Firm* — WRB-IP LLP

(57) ABSTRACT

An engine arrangement of the type including an internal combustion engine having an EGR line, wherein at least one turbine is located on an exhaust line, is provided. The arrangement includes a water vapor generating arrangement using exhaust gases energy to transform liquid water into water vapor. The water vapor is injected in the exhaust line upstream of the turbine. The EGR line is branched off the exhaust line upstream of the turbine and the water vapor generating arrangement includes at least one EGR/water heat exchanger for exchanging heat between the EGR line and the water to be vaporized.

18 Claims, 1 Drawing Sheet

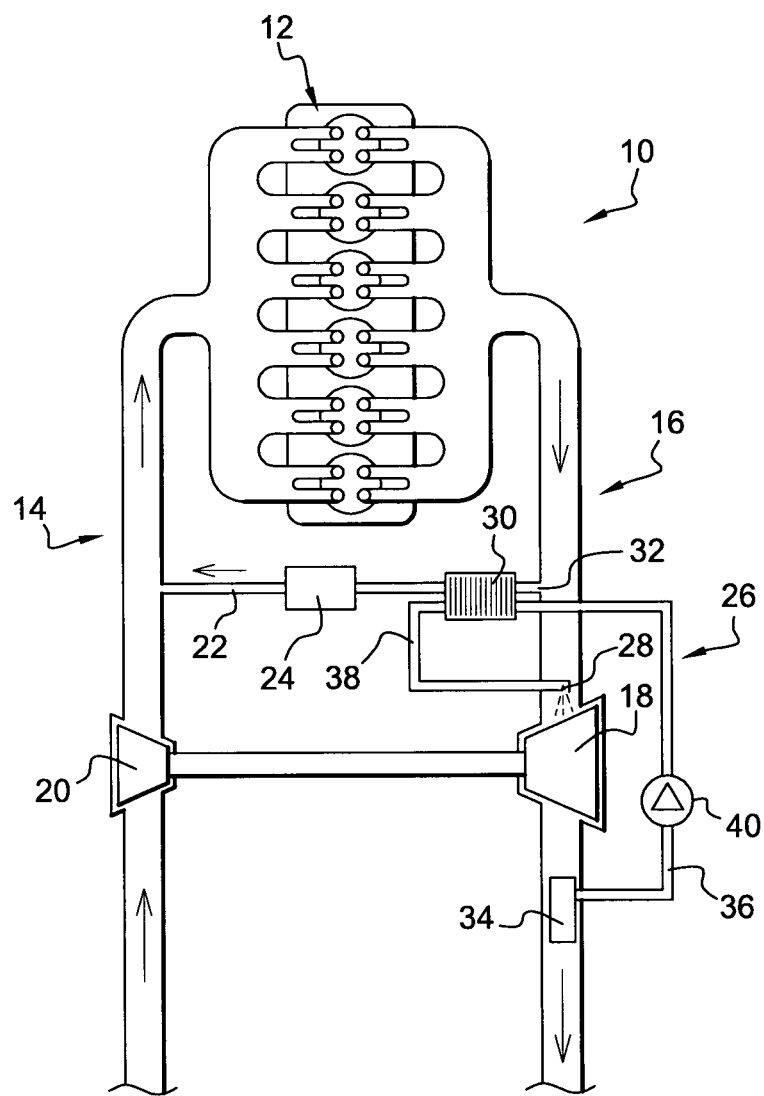

ENGINE ARRANGEMENT WITH AN IMPROVED EXHAUST HEAT RECOVERY ARRANGEMENT

BACKGROUND AND SUMMARY

The invention belongs to the field of engine arrangements of the type comprising an internal combustion engine having an intake line, an exhaust line and an EGR line for recirculating gases from the exhaust line to the intake line, wherein at least one turbine is located on the exhaust line, wherein the arrangement comprises a water vapor generating arrangement using exhaust gases energy to transform liquid water into water vapor, and wherein said water vapor is injected in the exhaust line upstream of the turbine.

Such arrangements take advantage of the heat which is carried in the exhaust gases, and which is generally simply released in the atmosphere and lost, by transforming the heat into mechanical energy which is recovered on the turbine shaft thanks to the expansion and/or cooling of the heated water vapor in the turbine. The recovered energy can be used in a variety of ways.

Document JP-2001.132.538 discloses an engine arrangement of the type above wherein the water circuit comprises two heat exchangers for heating the water and transforming it into vapor. The first exchanger takes heat from a charge air circuit, i.e from air which has been compressed by a turbo-compressor before being introduced in the internal combustion engine. Such air is not very hot, typically in the range of 130 to 200° C. The second heat exchanger takes heat from the exhaust gases which circulate in the exhaust line downstream of the turbine. These gases, although quite hot, have undergone an expansion in the turbine whereby their heat has been diminished by up to 100° C., down to 300° C. as a mean temperature. Therefore, although the system shown in this document may be well suited for certain uses, such as a stationary power generation units, it may not be suited for other applications such as for the propulsion of a vehicle. Indeed, while stationary power engine arrangements operate at steady conditions where the temperatures of the exhaust gases are well controlled within a limited range of temperatures, vehicle applications require that the engine arrangement works at varying loads, which can lead to very different exhaust temperatures. There is therefore a need to design an improved arrangement where operation of the water vapor generating arrangement can be guaranteed over a wider range of operating conditions.

In view of the above, the invention provides for an engine arrangement of the type above, characterized in that the EGR line is branched off the exhaust line upstream from the turbine and in that water vapor generating arrangement comprises at least one EGR/water heat exchanger for exchanging heat between the EGR line and the water to be vaporized.

DESCRIPTION OF FIGURES

FIG. 1 presents a schematic diagram of an embodiment of an engine arrangement according to the invention.

DESCRIPTION

The engine arrangement 10 which is depicted in FIG. 1 comprises an internal combustion engine 12 such as a heavy duty multi-cylinder Diesel engine for the propulsion of vehicle such as a heavy truck. The engine could also be an engine running on gasoline or on gas. The engine 12 is provided with combustion air through an intake line 14, and an exhaust line 16 is provided to collect exhaust gases coming out from the engine 12. The engine arrangement 10 comprises a turbine 18 which is located on the exhaust line 16 and which is driven by the flow of exhaust gases in the exhaust line. In this embodiment, the turbine 18 is part of a turbo-compressor whose compressor 20 is located on the intake line 16, so that, driven by the turbine 18 to which it is mechanically linked, the compressor 20 may compress the combustion air which is to be fed to the engine 12. Nevertheless, as will be explained more in detail below, the invention can be carried out with a turbine 18 not being part of a turbo-compressor. The engine arrangement also comprises an EGR line 22 for recirculating gases from the exhaust line to the intake line. Such EGR system is well known to the man in the art and may comprise an EGR cooler 24 for cooling the EGR gases. The EGR cooler may be connected to the engine fluid cooling circuit, or may simply be an air/air cooler cooled by ambient air. An EGR valve, not shown, may be provided in the EGR line 22 to control the flow of exhaust gases that are recirculated through the EGR line 22.

The intake line 14 would most likely be equipped with air filtering means, not shown, while the exhaust line 16 would advantageously be equipped with exhaust gases after-treatment systems such as a diesel particulate filter and/or a catalytic converter.

According to the invention, the engine arrangement 10 is equipped with a water vapor generating arrangement 26 which feeds an injector 28 for injecting water vapor in the exhaust line 16, upstream of the turbine 18. According to the invention, water is to be injected in the exhaust line essentially under its vapor form, so that the latent heat necessary to transform water from liquid to vapor is not taken from the exhaust gases which are to be circulated through the turbine. The water vapor thus injected in the exhaust line 16 will go through the turbine 18 where it will be cooled and/or expanded so that part of the energy contained in the vapor is transformed into mechanical energy in the turbine 18. Of course, the water vapor here complements the similar expansion/cooling of the exhaust gases through the same turbine 18. Therefore, the mechanical energy is retrieved from the water vapor without a dedicated expander since the expander is arranged here in a simple form and shared with the exhaust gases for which the same device also serves as an expander.

The mechanical energy thus recovered can be used differently depending on what the turbine 18 is mechanically connected to. In the example shown, the turbine 18 is that of a turbo-compressor, so that the recovered energy is used to increase the capacity to compress intake gases. In other embodiments, the turbine could be connected to an electrical generator instead of, or in addition to, being mechanically connected to the compressor so that the energy contained in the water vapor could be transformed into additional electrical energy, the electrical energy having the advantage that it can be stored, for example in batteries. In still other embodiments, the turbine could be mechanically connected to the engine crankshaft, as known in so called "turbo-compound" arrangements, to be used directly as mechanical energy. Nevertheless, the embodiment shown on FIG. 1, where the turbine 18 is that of a turbo-compressor, has the great advantage that the energy contained in the water vapor can be at least partially recovered without having to add any hardware as many modern engine arrangements are now equipped with such turbo compressors.

According to the invention, the water which is to be injected in vapor form is at least partially heated by the EGR gases circulating in the EGR line. Indeed, the water vapor generating arrangement 26 comprises at least one EGR/water heat exchanger 30 for exchanging heat between the EGR line 22 and the water to be vaporized. Preferably, the EGR/water heat exchanger is arranged as a boiler where the water enters in liquid form and exits essentially as vapor form.

As can be seen on FIG. 1, the EGR line 22 branches-off the exhaust line 22 at a location 32 which is located upstream of the turbine 16. Preferably, the branching-off location 32 is as upstream as possible so as to collect exhaust gases at the highest possible temperature. Because such EGR gases have not been expanded in the turbine, they typically exhibit a temperature of 400 to 500° C. Such arrangement is commonly used in the so-called "short-route" EGR arrangements. Thanks to this feature, the amount of heat which can be transferred to the water through the EGR water heat exchanger 30 is maximized, so that it becomes possible to guarantee that the water is effectively transformed into vapor over a wide range of engine operating conditions.

Moreover, the branching-off location 32 is upstream of the injector 28 in the exhaust line, so that the water vapor is preferably injected in the exhaust line downstream of the point 32 at where the EGR line 22 is branched off the exhaust line 16.

According to another feature of the embodiment depicted on FIG. 1, at least part of the water which is to be injected in the exhaust line upstream of the turbine is recovered by retrieval under liquid form of the water contained in the exhaust gases downstream of the turbine 16. Therefore, the water vapor generating arrangement 26 is also provided with a condenser 34 located in the exhaust line 16, downstream of the turbine 18. Depending on the operating conditions and on the efficiency needed, this condenser can be very basic and may be formed by fins extending on the internal surface of the exhaust line. Of course, more sophisticated condensers can be used for separating the water contained in the exhaust gases, whether in liquid or vapor form. It must be noted that the condenser will not only condense water originating from the water which has been injected by injector 28 but also water being contained in vapor form as a mere result of the combustion process in the engine. Therefore, even with a low efficiency condenser, which would let out a non negligible amount of water vapor to the atmosphere through the exhaust, may be enough to recover the water necessitated to feed the injector.

The water vapor generating arrangement 26 thus comprises a water circuit comprising the condenser 34, the EGR/water heat exchanger 30, a feed conduit 36 fluidically connecting the condenser 34 to the exchanger 30, and a supply conduit 38 for supplying the water vapor generated in the exchanger 30 to the injector 28. Although it could be provided that water is circulated by mere gravity from the condenser 34 to the exchanger 30, a pump 40 will preferably be provided in the feed conduit 36 to achieve such circulation. The pump will preferably pressurize the water under liquid form, for example up to a pressure of 4 to 10 bars.

A water storage tank, not shown on FIG. 1, can be provided, for example between the condenser 34 and the pump 40. Also, it could be provided that other sources of liquid water are provided. For example, it is well known that air conditioning units create condensation water when operating under certain conditions. This condensation water is usually lost. But, for example in a vehicle equipped with both an engine arrangement according to the invention and with an air conditioning unit, the condensation water generated by the air conditioning unit may be collected by recovering means and may be provided as extra water to the water vapor generating arrangement. The water circuit may be equipped with means for regulating the amount of water in the circuit, for example a purge system for evacuating water which may be collected by the condenser in excess to what is needed to feed injector 28.

The water vapor generating arrangement may be provided with means for pressurizing said vapor further. In any case, the water vapor pressure exceeds at least the pressure in the exhaust line at the location of injector 28.

Optionally, the water vapor generating arrangement can be equipped with a pressurized water vapor reservoir located on the water circuit between the exchanger 30 and the injector 28, or incorporated therein. Such a reservoir would make it possible to decouple the periods time were the water is effectively and massively vaporized, i.e. when big amounts of high temperature EGR gases are circulating in the EGR line 22, from the periods of time when injection of water vapor in the exhaust line can be most effective, for example at low engine loads to boost the turbine, if those periods do not overlap totally. The capacity of such reservoir, in terms of volume and in terms of pressure of the vapor stored therein, is determined by the degree of decoupling which needs to be handled. In such a case, the arrangement 26 is preferably equipped with electronic control means, such as an electronically controlled injector 28, for controlling the injection of water vapor in the exhaust line 16. Such electronically controlled injection means can also be provided absent a water vapor reservoir.

According to another feature of the depicted embodiment, and in the case where the EGR line 22 is equipped with an EGR cooler 24, said EGR cooler 24 will preferably located on the EGR line 22 downstream of the EGR/water heat exchanger 30.

Also to noted is that, in case of an engine arrangement equipped with a exhaust after-treatment system, such as a diesel particulate filter and/or with an catalytic converter, the condenser 34 would preferably be located downstream of such system in the exhaust line.

Although not shown on the figures, the engine arrangement could comprise further compressors and/or turbines respectively on the intake line and on the exhaust line. In such a case, it will be advantageous to provide that the EGR line is branched-off the exhaust line before the most upstream turbine on the exhaust line.

The invention claimed is:

1. Engine arrangement of the type comprising an internal combustion engine having an intake line, an exhaust line and an EGR line for recirculating gases from the exhaust line to the intake line, wherein at least one turbine is located on the exhaust line, wherein the arrangement comprises a water vapor generating arrangement using exhaust gases energy to transform liquid water into water vapor and wherein the water vapor is injected in the exhaust line upstream of the turbine,
   wherein the EGR line is branched of the exhaust line upstream of the turbine and the water vapor generating arrangement comprises at least one EGR/water heat exchanger for exchanging heat between the EGR line and the water to be vaporized.

2. Engine arrangement according to claim 1, wherein the water vapor generating arrangement comprises a water condenser for condensing and retrieving; water contained in the exhaust gases circulating in the exhaust line downstream of the turbine, and the retrieved water is fed to the EGR/water heat exchanger.

3. Engine arrangement according to claim 2, wherein the water vapor generating arrangement comprises a pump for circulating water from the condenser to the EGR/water exchanger.

4. Engine arrangement according to claim 3, wherein the pump delivers pressurized water to the EGR/water exchanger.

5. Engine arrangement according to claim 1, wherein the EGR/water heat exchanger is arranged as a boiler where the water enters in liquid form and exits essentially as vapor form.

6. Engine arrangement according to claim 1, wherein the water vapor generating arrangement comprises a liquid water tank for storing liquid water to be vaporized.

7. Engine arrangement according to claim 1, wherein the water vapor generating arrangement comprises a water vapor reservoir for storing water vapor.

8. Engine arrangement according to claim 1, comprising electronically controlled injection means for controlling the flow of water vapor injected in the exhaust line.

9. Engine arrangement according to claim 1, wherein the EGR line comprises an EGR cooler located downstream of the EGR/water heat exchanger in the EGR line.

10. Engine arrangement according to claim 1, wherein the turbine is mechanically connected to a compressor located on the intake line.

11. Engine arrangement according to claim 1, wherein the water to be vaporized is heated in the EGR/water heat exchanger.

12. Engine arrangement of the type comprising an internal combustion entire having an intake line an exhaust line and an EGR line for recirculating eases from the exhaust line to the intake line, wherein at least one turbine is located on the exhaust line, wherein the arrangement comprises a water vapor generating arrangement using exhaust wises energy to transform liquid water into water vapor and wherein the water vapor is injected in the exhaust line upstream of the turbine, wherein the EGR line is branched off the exhaust line upstream of the turbine and the water vapor generating arrangement comprises at least one EGR/water heat exchanger for exchanging heat between the EGR line and the water to be vaporized, and, wherein the water vapor is injected in the exhaust line downstream of the location at where the EGR line is branched off the exhaust line.

13. Engine arrangement according to claim 12, wherein the water vapor generating arrangement comprises a water condenser for condensing and retrieving water contained in the exhaust gases circulating in the exhaust line downstream of the turbine, and the retrieved water is fed to the EGR/water heat exchanger.

14. Engine arrangement according to claim 12, wherein the EGR/water heat exchanger is arranged as a boiler where the water enters in liquid form and exits essentially as vapor form.

15. Engine arrangement according to claim 12, wherein the water vapor generating arrangement comprises a water vapor reservoir for storing water vapor.

16. Engine arrangement according to claim 12, comprising electronically controlled injection means for controlling the flow of water vapor injected in the exhaust line.

17. Engine arrangement according to claim 12, wherein the EGR line comprises an EGR cooler located downstream of the EGR/water heat exchanger in the EGR line.

18. Engine arrangement according to claim 12, wherein the turbine is mechanically connected to a compressor located on the intake line.

* * * * *